United States Patent [19]
Gallo

[11] Patent Number: 5,680,441
[45] Date of Patent: Oct. 21, 1997

[54] ADAPTOR SET FOR CONVERTING STANDARD TELEPHONE INTO CORDLESS TELEPHONE USING REPLACEMENT HANDSET

[76] Inventor: Bruce Gallo, 21 Starrett Ct., Sparta, N.J. 07871

[21] Appl. No.: 345,500

[22] Filed: Nov. 28, 1994

[51] Int. Cl.[6] .................... H04Q 7/20; H04Q 7/32
[52] U.S. Cl. .................... 379/61; 379/58; 455/38.3; 455/343
[58] Field of Search .................. 379/61, 63, 58; 455/343, 38.3, 89

[56] References Cited

U.S. PATENT DOCUMENTS

| | | | |
|---|---|---|---|
| 4,158,173 | 6/1979 | Saraceni et al. | 455/343 |
| 4,768,219 | 8/1988 | Yamagata et al. | 379/61 |
| 4,860,005 | 8/1989 | De Luca et al. | 455/343 X |
| 4,965,849 | 10/1990 | Kunihiro | 379/61 X |
| 5,010,565 | 4/1991 | Nash et al. | 379/61 |
| 5,105,460 | 4/1992 | Williams | 379/61 X |
| 5,321,738 | 6/1994 | He | 379/58 |
| 5,365,573 | 11/1994 | Sakamoto et al. | 379/61 |

*Primary Examiner*—Dwayne Bost
*Assistant Examiner*—Nay Maung
*Attorney, Agent, or Firm*—Plante & Strauss

[57] ABSTRACT

A conversion kit, consisting of a two piece adaptor set, allows a conventional non-cordless telephone to be converted to a cordless telephone. A first piece consists of a unitary body which houses a transmitter/receiver therein and a conventional modular male telephone plug. The second piece consists of a transmitter/receiver built into a replacement handset. To covert a standard non-cordless telephone to a cord- less telephone, the coiled telephone handset cord, and the corded-handset are removed. The first transmitter/receiver body is plugged into the modular jack in place of the coiled cord, and the replacement handset is simply set into the cradle.

19 Claims, 4 Drawing Sheets

ADAPTOR SET FOR CONVERTING STANDARD TELEPHONE INTO CORDLESS TELEPHONE USING REPLACEMENT HANDSET

BACKGROUND OF THE INVENTION

1. Field of Invention

The present invention relates to a conversion kit for converting a conventional telephone into a cordless telephone, and more particularly to a conversion kit consisting of a two piece adaptor set in which each piece comprises a transmitter/receiver and a modular telephone plug.

2. Brief Statement of the Prior Art

The familiar, conventional, non-cordless telephone consists of a telephone base, a handset, and an interconnecting cord between the telephone base and the handset. The cord, usually a coiled cord, is terminated at either end thereof by a modular, quick connect/disconnect, male telephone plug. The modular male plug on one end of the cord plugs into a corresponding modular female socket on the telephone base and the other end of the cord plugs into a similar socket on the handset. As used here, the term "modular telephone plug" refers to the familiar, standardized, four wire, male and female telephone plugs, that are exclusively used throughout the telephone industry.

A number of years ago cordless telephones were invented. In conventional cordless telephones, a first radio transmitter/receiver is located within the telephone base station and this first radio transmitter/receiver communicates with a corresponding transmitter/receiver that is built into the handset.

U.S. Pat. No. 3,919,091 to Luce and German OS 1 930 531 are illustrative of numerous patents which disclose cordless telephones.

U.S. Pat. No. 1,594,262 to Homer describes an external coupler which is connected by wires to a telephone instrument and which serves to receive radio signals and to transmit the radio signals through the telephone set over telephone utility lines.

U.S. Pat. No. 3,952,167 to Suzuki et al. discloses a coupler for a telephone which is used to connect the telephone to other communication facilities such as a facsimile transmitter/receiver. The coupler of this patent is not, however, utilized for transmitting and receiving voice communications between a telephone base and a telephone handset, nor is the coupler a wireless attachment.

Presently, a conventional non-cordless telephone cannot be converted to a cordless telephone. If a person wants to enjoy the advantages of a cordless telephone he or she must discard their conventional telephone and replace it with one of the numerous models of the especially designed and more expensive cordless telephones that are available on the market. From an economic point of view and for versatility, it would be advantageous to provide an ability to convert/upgrade a conventional telephone to a cordless telephone.

OBJECTS OF THE INVENTION

Accordingly, it is an object of the present invention to provide a telephone conversion kit for converting a conventional non-cordless telephone to a cordless telephone.

It is another object of the present invention to provide a two piece adaptor set for replacing the wire cord on a conventional telephone to provide wireless voice communication between a telephone base and its handset.

It is still a further object of the present invention to provide a conversion kit for enabling optional converting of a conventional telephone to a cordless telephone in a manner which permits ready restoring of the converted telephone to a conventional telephone, by means of a pair of transmitter/receivers.

It is an additional object of this invention to provide the conversion kit of the present application such as it would incorporate one of the transmitter/receiver pieces of the adaptor set inside a replacement handset, thereby reducing the size and weight of the adaptor pieces and improving ease of use and aesthetics.

It is yet another object of the present invention to provide a conversion kit which can be used to convert virtually all conventional telephones to cordless phones.

It is a still further object of the present invention to provide a cordless handset which achieves maximum efficiency of battery use and thereby avoids the necessity to incorporate a battery charger that limits the adaptability of the conversion kit to many conventional telephones.

It is also an object of the present invention to provide a conversion kit which can be used effectively in an office environment having multiple phones serviced by a single switchboard or PBX system.

Other objects will be apparent from the following description of the invention.

BRIEF STATEMENT OF THE INVENTION

The foregoing and other objects of the invention are realized by a telephone conversion kit that consists of a two piece adaptor set. Each piece of the adaptor set comprises a radio transmitter/receiver and a terminal means, for example, a modular male telephone plug, connected to the transmitter/receiver for providing quick connection and disconnection to telephone bases or handsets. Preferably, the second piece of the adaptor set comprises a radio transmitter/receiver which is fitted inside a replacement handset. In this embodiment, the original handset of the conventional telephone is not used.

In accordance with the present invention, a conventional non-cordless telephone may be converted to a cordless telephone exceedingly rapidly and simply by removing the telephone cord between the telephone base and handset and replacing same with a first one of the adaptor pieces which is plugged into the telephone cord jack in the base. The adaptor piece attached to the telephone base is designed to transmit, by radio waves or the like, sound originating in the telephone base to the receiver located in the handset and, vice versa, the transmitter in the handset is adapted to transmit sound originating in the handset to the receiver connected to the telephone base, effectively providing cordless telephone operation. The two piece adaptor set may be easily disconnected from the telephone base and handset and the telephone cord replaced whenever this is desired.

In accordance with the embodiment which uses a replacement handset, the second transmitter/receiver is located within the replacement handset and wireless communication takes place between the first transmitter/receiver which is connected to the telephone base and the second transmitter/receiver which is located within the replacement handset.

ADVANTAGES OF THE INVENTION

Major improvements and advantages are realized in the embodiment which uses the replacement handset (over an embodiment which uses a separately provided transmitter/receiver which is designed to be connected to a conventional handset) in that:

1. The difficulties attending attaching the second transmitter/receiver to an existing handset, which could be quite complex, are avoided. Further, aesthetically, an integrated, self-contained, replacement handset is preferred. Still further, providing and attaching an externally mounted transmitter/receiver will make the handset heavy and bulky and more difficult to use which would constitute a major impediment to marketing of the device.

2. The cost of the second transmitter/receiver may be reduced by eliminating several components and connectors necessary to adapt the second transmitter/receiver for the purposes of enabling the attaching thereof to a conventional handset. In other words, providing a replacement handset produces mechanical and electrical cost advantages.

3. By providing a replacement handset, speaker and microphone elements can be custom chosen to maximize performance by matching them with the transmitter/receiver electronics.

4. A replacement handset can be constructed smaller, lighter and as a more contemporarily styled unit, which may be a major factor in improving the marketability thereof. Moreover, a replacement handset can be custom designed in a variety of styles and presentations which would further enhance its appeal, recognition and manufacturability.

The adapter set is provided with a channel scanning circuit whereby it may be used in multiple phone systems typical of most office and business phone installations. The channel scanning circuit permits each handset to scan for an available channel, thereby eliminating cross talk and interference with other channels in use in the office at any time.

The handset is provided with a power saving circuit which includes an internal motion switch which starts a resetable timer when motion is detected. The timer is set for a suitably short period to insure that power to the handset is interrupted promptly when its use is discontinued. This greatly extends the useful life of the handset battery and permits use of long life replaceable batteries, eliminating the need to encumber the installation with a battery charger, or a manual on/off switch.

Other features and advantages of the present invention will become apparent from the following description of the invention which refers to the accompanying drawings.

BRIEF DESCRIPTION OF THE DRAWINGS

The invention will be described with reference to the figures of which.

DESCRIPTION OF THE PREFERRED EMBODIMENT

Figure 1:
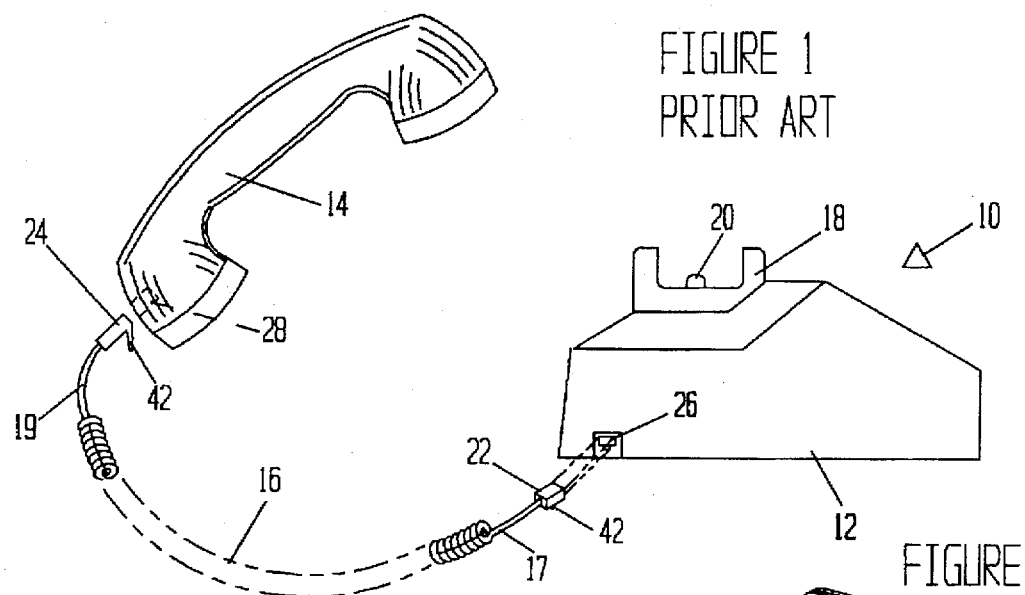
FIG. 1 shows a conventional prior art telephone.

Referring to the drawings, a conventional non-cordless telephone 10 consists of a base station 12, a handset 14 and a cord 16. When the telephone 10 is not being used, the handset 14 rests atop the cradle 18 of telephone base and operates the hook switch 20 to enable receiving of incoming calls. The cord 16 is terminated at one end 17 thereof by a first modular male telephone plug 22 and by a similar plug 24 that is connected at the other end 19 thereof. Plug 22 is designed to plug into the modular female socket 26 on the telephone base 12 and, similarly, the other plug 24 is receivable in the telephone socket 28 on the telephone handset 14. The locking tabs 42 on the plugs 22 and 24 serve to lock the plugs in the sockets 26/28. However, the free end of the tab 42 which protrudes from the socket can be grasped and depressed to free the plug from the socket 26 or 28.

As taught by the prior art, a conventional non-cordless telephone 10 as in FIG. 1 can not be converted into a cordless telephone. Consequently, those desiring to enjoy the advantages of a cordless telephone must replace their conventional telephone with a more expensive, especially designed, cordless telephone model.

Figure 2:
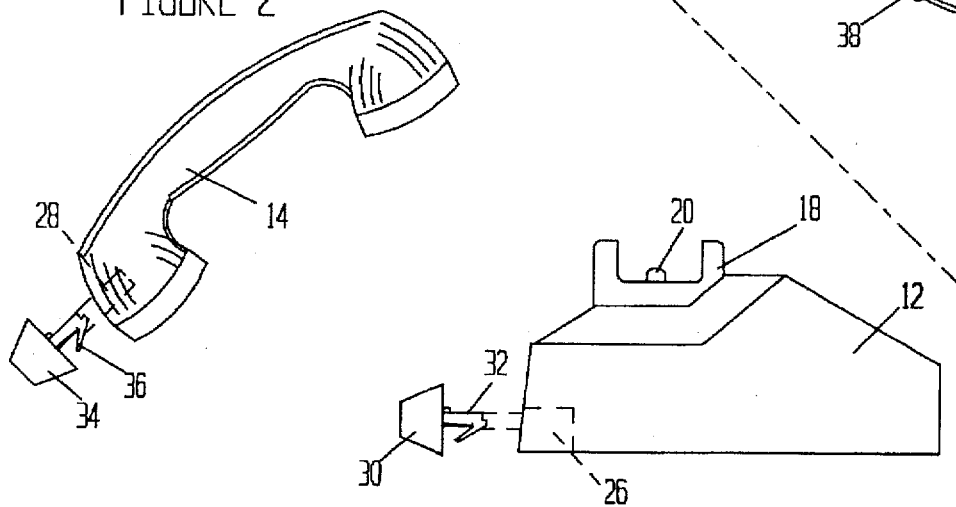
FIG. 2 shows the conventional prior art telephone of FIG. 1 wherein its cord has been removed and replaced by a pair of transmitters/receivers.
Figure 4:
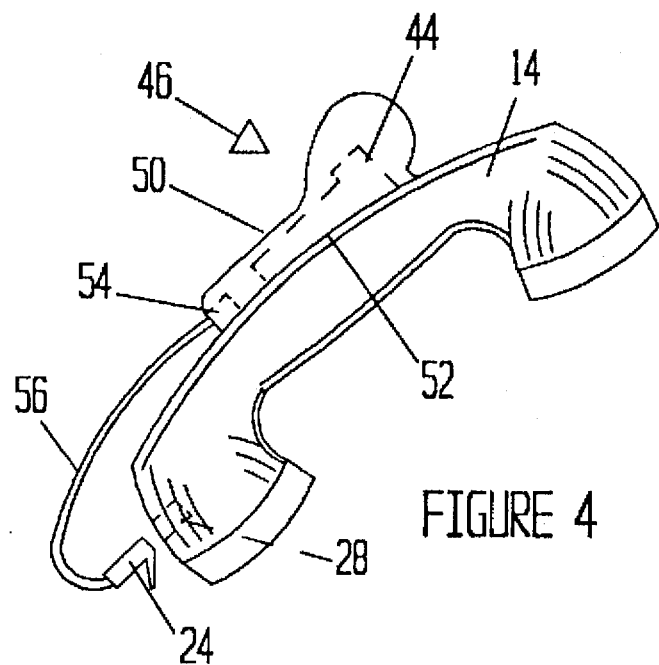
FIG. 4 shows conventional prior art wherein the transmitter/receiver of the telephone handset is embedded in and constitutes a handset shoulder rest.

However, in accordance with the present invention and as illustrated in FIG. 2, the present invention enables the conventional telephone 10 of FIG. 1 to be converted to a cordless telephone in a rather simple and straightforward manner. To this end, the present invention provides a first transmitter/receiver element 30 that is especially designed to be plugged directly into the female socket 26 of the telephone base 12 by means of the modular male telephone plug 32 attached thereto.

A similar second transmitter/receiver element 34 with a modular male telephone plug 36 is designed for being plugged into the female modular telephone socket 28 on the handset 14.

As has been noted, the transmitter portion in the transmitter/receiver element 30 serves to transmit to the receiver in the other transmitter/receiver element 34, sound originating in the telephone base 12, by radio or similar waves. Similarly, sound originating in the handset 14 is transmitted from the transmitter of the element 34 to the receiver in the element 30. Details of the transmitter/receiver circuits in the elements 30 and 34 are well known to those skilled in the art and need not be reiterated herein. Illustrative transmitter/receiver circuits for cordless telephones are described, for example, in the following U.S. Pat. Nos. 4,241,236; 4,238,850; 4,228,320; 4,224,482; 4,221,932; 4,213,009; 4,184,052; 4,159,448; 4,061,880; 4,057,781; 4,053,717; 4,039,760; and 4,032,723. The contents of the aforesaid patents are incorporated by reference herein.

Figure 3:
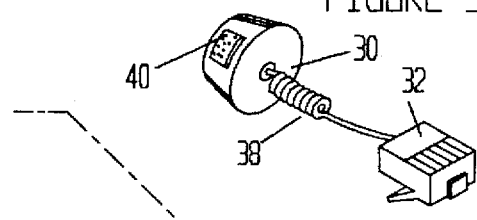
FIG. 3 shows conventional prior art in which at least one of the transmitters/receivers has its male plug connected thereto by a short wire.

Sometimes, the telephone base 12, or a similar wall mounted unit, may be located in a tight space where it would be difficult to accommodate the body of the transmitter/receiver element 30 near the telephone socket 26. Accordingly, FIG. 3 illustrates an embodiment in which the first transmitter/receiver element 30 and its male modular plug 32 are connected to one another by a relatively short cord 38. The cord 38 allows the body of the transmitter/receiver 30 to be located away from the modular telephone socket 26 of telephone base 12. In addition, the transmitter/ receiver may include a mounting element 40, consisting of a Velcro swatch, an adherent pad or the like, that is suitable for attaching the body of the transmitter/receiver element 30 to the outer surface of the telephone base 12 or to any other surface, if desired.

Figure 5:
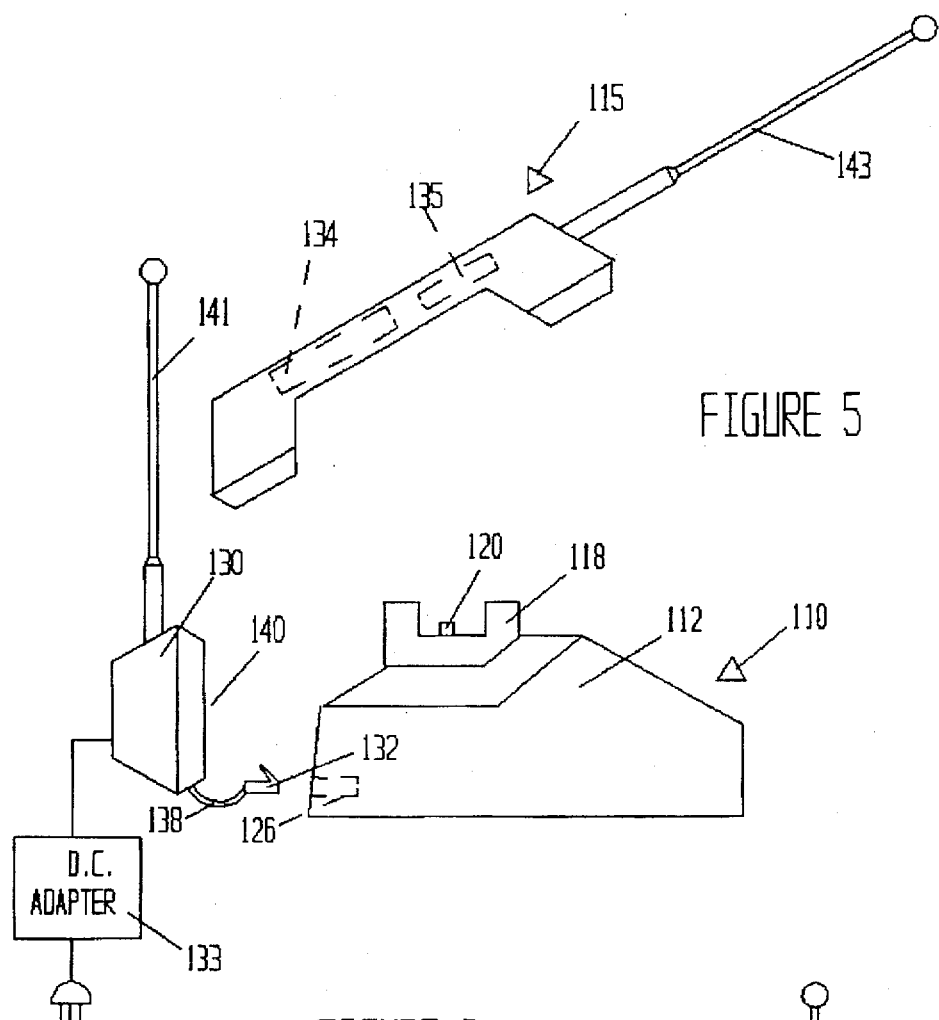
FIG. 5 shows the conventional prior art telephone of FIG. 1, which, in accordance with a further embodiment, has its cord removed and replaced by a pair of transmitter/receivers, one of which is incorporated into a replacement handset.

Referring now to FIG. 5, the present invention provides a simple conversion kit consisting of a two piece adaptor set which includes the first and second transmitter/receiver elements 130 and 115. The invention makes it possible to convert, in a matter of seconds, a conventional telephone 110 as in FIG. 5 to a cordless telephone as in FIG. 2, through simple removing of the cord 16 (shown in FIG. 2) and the replacement thereof by the transmitter/receiver elements 130 and 115.

The first transmitter/receiver element 130 is designed to be connected to the telephone base 112 and would derive its power from a DC adaptor 133 or an internal battery. The other transmitter/receiver element 115 is battery operated and may be provided with a replaceable battery, 135 shown in broken lines. Replaceable alkaline batteries have a useful life which is about four times the useful life of current Ni—Cd batteries (before requiring recharging). The presently available lithium batteries afford even greater useful life, and when used with the power saving circuitry of this invention, will last for several months of normal business or office use. Cordless operation over a radius measuring about 25 feet from the telephone base 112 can easily be obtained. The transmitter/receiver element 130 of the invention are modularly constructed and may be provided with an adjustable potentiometer to provide impedance matching for different phones. However, as the power saving circuitry would extend the life of rechargeable batteries, the latter may also be used, with the benefit of extended use between rechargings.

Referring to FIG. 5, a further embodiment of the invention of FIG. 2 is illustrated in which the second transmitter/ receiver 34 of FIG. 2 has been replaced within a replacement handset 115. In accordance with the presently described embodiment, to convert a standard corded telephone to a cordless telephone, the coiled telephone handset cord 16 and the conventional corded handset 14 are removed.

In the FIG. 5 embodiment (in which reference numerals designating elements which also appear in FIG. 2 have the numeral 100 added to them) the first transmitter/receiver body 130 is plugged into the modular jack 126 of the telephone base 112, in place of the coiled cord 16. The replacement handset 115 is simply set into the cradle 118.

More specifically, FIG. 5 depicts a conventional corded telephone base 112 with a cradle 118, a hook switch 120, and a modular plug 126. The first transmitter/receiver 130 has a body with a short cord 138 and a plug 132 which is receivable in the plug 126. The transmitter/receiver 130 communicates wirelessly through an antenna 141 and, if desired, can be secured to the telephone base 112 by a securing means 140. As previously mentioned, a DC adaptor 133 which connects to conventional 110 volt AC line power can be provided to supply electrical power to the first transmitter/receiver 130.

The replacement handset 115 houses the second transmitter/receiver 134 (which corresponds to the transmitter/receiver 34 in FIG. 2) and a battery 135 and has mounted to it an antenna 143. Operationally, the system of FIG. 5 performs in the same manner as the system of FIG. 2, except that the replacement handset 115 affords improvement in aesthetics, portability, and convenience of use.

Figure 6:
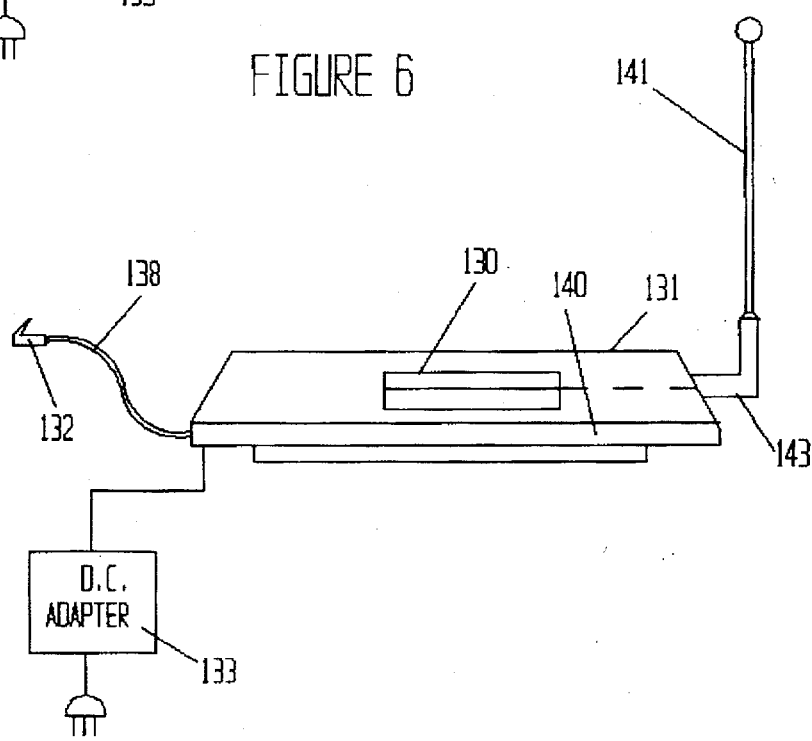
FIG. 6 shows a further variant of a transmitter/receiver which is housed in a plastic enclosure and configured to be connected to a conventional telephone base.

FIG. 6 illustrates the first transmitter/receiver 130 of FIG. 5 within a housing 131 which affords the possibility of placing the telephone base 112 thereon. The rectangular or similarly shaped body 131 also accesses a plug from DC supply 137 which connects to 110 volt a.c. line power. Securing means 140 can be provided on the bottom to provide adherability to the resting surface and may also be provided at the top for enabling the telephone base to adhere thereto. The antenna 141 may be provided with a swivel 143.

Figure 7:
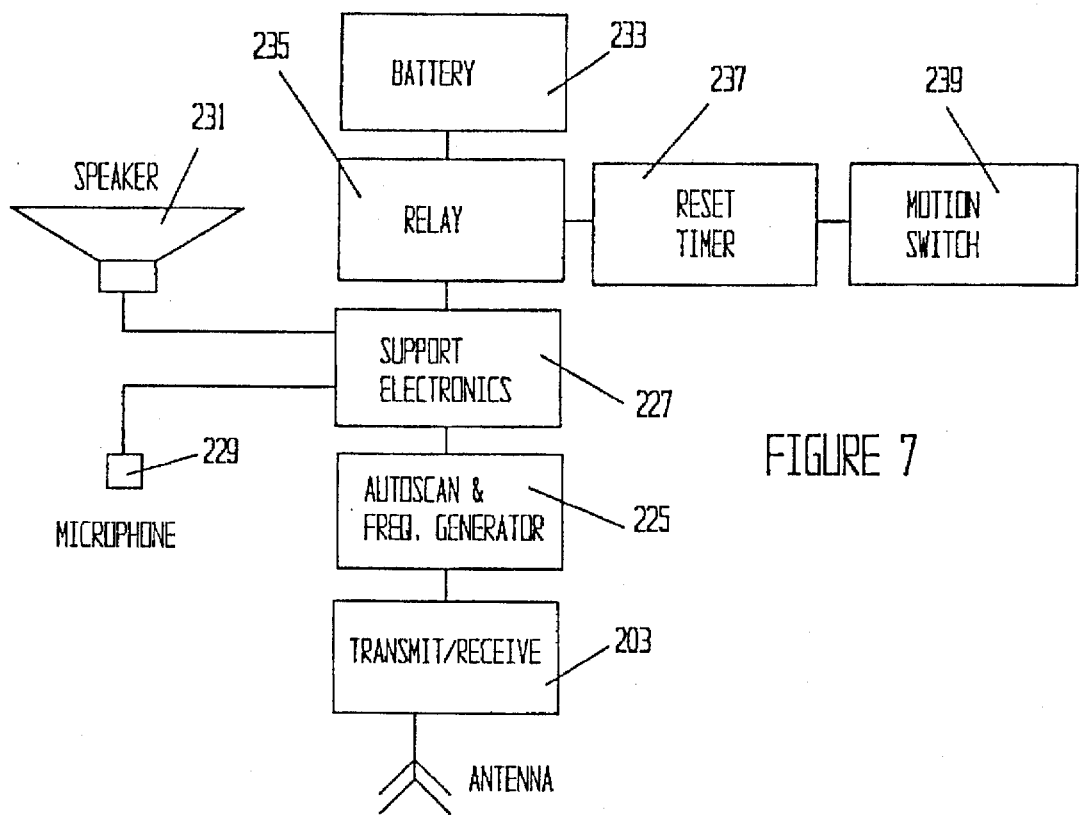
FIGS. 7 and 8 are block diagrams of the preferred embodiment which includes channel scanning circuitry and power saving circuitry.
Figure 8:
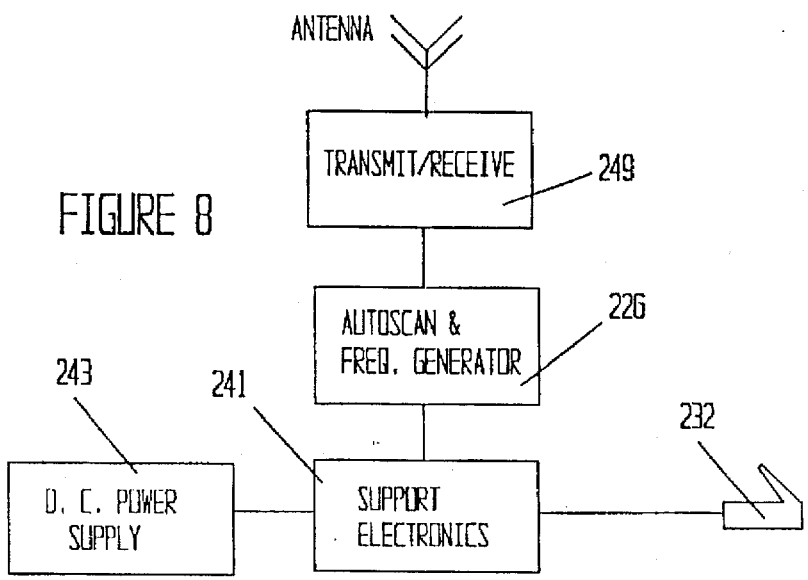

Referring now to FIGS. 7 and 8, the preferred circuitry that is particularly well suited for an office environment will be described. Offices have many telephones serviced by a central station, and the number of available channels is limited by FCC regulations to a maximum of 10 at the 50 mega-Hz frequency, and 32 at the 900 mega-Hz frequency. Thus cordless telephones which operate at fixed channel frequencies would be limited to a maximum of 10 or 32 in an office without experiencing cross-talk or interference. To avoid this limitation, this invention incorporates a channel scanning function in the conversion kit.

FIG. 7 illustrates the additional circuitry which to incorporates the power saving and channel scanning functions of the preferred embodiment. As illustrated, the handset includes a transmit/receive microchip 203 which is connected to an auto-scanning and frequency generator microprocessor 225 that selects and sets the operational frequency of the transmit/receive chip 203. The microprocessor 225 automatically scans the band of available channels following a preset algorithm and detects the channels having low energy levels (unused channels) and, with a hand-shaking routine with the auto-scanning microprocessor 226 of the base unit (see FIG. 8), and selects and locks onto one of the detected low energy channels. The support electronics 227 is a microchip containing the necessary operational amplifiers and matching circuits for the microphone 229 and speaker 231 of the handset.

Figure 9:
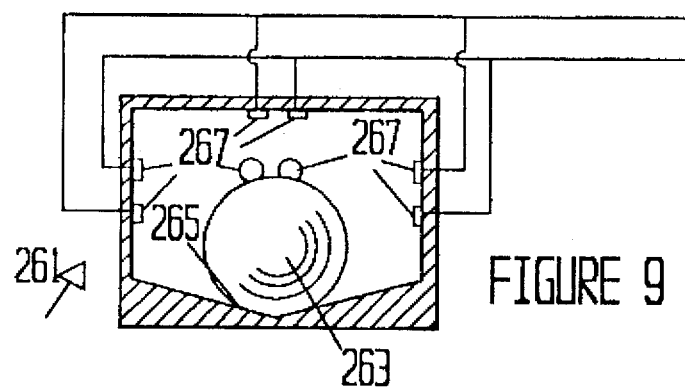
FIGS. 9 and 10 and illustrate useful motion sensitive switches.

The handset is powered by a replaceable battery 233, preferably a lithium battery for maximum useful life. However, a rechargeable battery may also be used. Where a recharging jack would be provided on the handset and a DC power supply would be plugged into the handset for recharging. The battery 233 is connected to the operating circuits of the handset by relay 235 which is normally off, and which is locked on by a resetable timer 237. The timer is energized by an input from motion sensing switch 239. The timer 237 is a 555 timer which has an adjustable duration, e.g., from 15 to 60 seconds. FIG. 9 illustrates a useful motion and position sensitive switch 261. The latter is a multi-axis, motion-sensitive switch, and has a metallic contact ball 263 contained in a housing 265 having pairs of contacts 267 on orthogonal interior walls, and a null ball recess 271 when the handset is placed horizontally, such as when it is placed on a desktop or in the telephone cradle. Thus, any movement of the handset will cause the ball to close the circuit through a pair of switch contacts, and reset timer 237.

Figure 10:
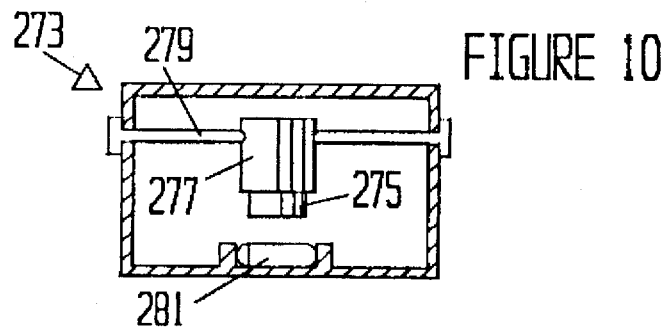

Another useful motion sensitive switch is the contactless switch 273 shown in FIG. 10. This switch has a permanent magnet 275 received in a boot 277 that is suspended by resilient arms 279 beside a coil 281. The boot and resilient arms can be a one-piece molded rubber or plastic element such as described in U.S. Pat. No. 4,584,569. Any relative movement of the coil and magnet will induce a voltage in the coil which can be amplified and converted by an analog to digital converter to a digital pulse signal which is supplied to reset the timer 237. This switch also, is multi-axis, i.e., omnidirectional in sensitivity, and its sensitivity can be controlled by selection of the stiffness of the resilient arms 279 and the mass of the magnet 275.

The base unit circuit is shown as a block diagram in FIG. 8. The unit has a conventional plug 232 which is inserted into the socket for the handset of the telephone. The support electronic chip 241 has a conventional switch hook circuit which shuts off the unit when it detects no speaker signal (on-hook) condition, and turns the unit on when it detects an off-hook condition. The base unit is powered by a d.c. power supply 243 which includes a transformer and rectifier circuits and which is connected to conventional 110 volt a.c. power line. The autoscan and frequency generator microprocessor 226 is a companion to the microprocessor 225 of the handset and performs the aforementioned channel scanning, detecting, hand-shaking and lock on functions previously described. Similarly, the transmit/receive microchip 249 is a companion to the transmit/receive microchip 203 of the handset.

Once installed, the operation of the conversion kit of the invention is entirely transparent, i.e., it permits the handset to be operated as a conventional handset, but without the restrictions of handset cord. The user simply picks the handset up from the telephone cradle which powers the base unit by the switch hook circuit. Lifting of the handset and tilting it to one's ear and mouth resets the timer to turn the relay contacts on thereby activating the handset. The handset and base unit initiate the autoscanning and hand-shaking routines to select an available low energy channel without experiencing any cross-talk or interference with other phones in the office.

Although the present invention has been described in relation to particular embodiments there- of, many other variations and modifications and other uses will become apparent to those skilled in the art. It is preferred, therefore, that the present invention be limited not by the specific disclosure herein, but only by the appended claims.

What is claimed is:

1. The conversion of a conventional non-cordless telephone to a cordless telephone, which comprises:

a the base of said non-cordless telephone including a handset cradle carried on said base and a switch hook operatively linked to said cradle;

b a first transmitter/receiver for transmitting and receiving electromagnetic waves and a respective terminal means electrically connecting said transmitter/receiver received in the terminal receptacle of said non-cordless telephone base;

c a replacement handset received in and resting directly on said handset cradle without any interfacing structural elements, said replacement handset including a second transmitter/receiver mounted within the replacement handset and effective for transmitting/ receiving electromagnetic waves and for communicating wirelessly with the first transmitter/receiver;

d a battery and power saving circuit in said handset, said power saving circuit including a normally off relay means with means to close the switch contacts of said relay means that includes an multi-axis motion sensitive switch to detect movement of said handset; and e a timer in circuit with said motion sensitive switch and said relay means in circuit therewith to maintain said switch contacts of said relay closed for a fixedly adjustable time interval.

2. The conversion kit of claim 1, wherein the respective terminal means of the first transmitter/receiver comprises a respective modular male telephone conventional plug.

3. The conversion kit of claim 2, wherein the first transmitter/receiver comprises a transmitter/receiver body and the respective modular plug of the first transmitter/ receiver is connected directly to the first transmitter/receiver body.

4. The conversion kit of claim 3, further including telephone mounting means for securing the first transmitter/ receiver body to the conventional non-cordless telephone base.

5. The conversion kit of claim 2, wherein the modular male plug on the first transmitter/receiver is physically spaced from the first transmitter/receiver and including a cord extending between the first transmitter/receiver and its respective modular male plug.

6. The conversion kit of claim 1, further including a respective locking tab on the terminal means of the first transmitter/receiver, the locking tab being effective for locking the terminal means within and releasing the terminal means from the telephone base.

7. A conversion kit for converting a conventional non-cordless telephone to a cordless telephone, the conversion kit comprising:

a a first transmitter/receiver for transmitting and receiving electromagnetic waves and a respective terminal means for enabling the first transmitter/receiver to be electrically connected to a non-cordless telephone base;

b a replacement handset for replacing a conventional handset which is associated with the non-cordless conventional telephone base, and a second transmitter/ receiver mounted within the replacement handset and effective for transmitting/receiving electromagnetic waves and for communicating wirelessly with the first transmitter/receiver;

c a battery and power saving circuit in said handset, said power saving circuit including a normally off relay means with means to close the switch contacts of said relay means that includes an omni-directional motion sensitive switch to detect movement of said handset; and d a timer in circuit with said motion sensitive switch and said relay means in circuit therewith to maintain said switch contacts of said relay closed for a fixedly adjustable time interval.

8. The conversion kit of claim 7 wherein said timer means is adjustable to permit variation of the duration of said time interval from 15 to 50 seconds.

9. The conversion kit of claim 1, further including first channel scanning circuit means in circuit with said first transmitter/receiver, and coacting second channel scanning circuit means in circuit with said second transmitter/ receiver, with said channel scanning circuit means operative to select and lock onto a low energy channel.

10. The conversion kit of claim 1, wherein said first and second channel scanning circuit means include a handshaking routine to select said low energy channel.

11. The conversion kit of claim 7 wherein said battery is a rechargeable battery and including recharging means and a recharging input jack on said handset for connection of said recharging means to said battery.

12. A telephone, comprising:

a a conventional non-cordless telephone base of a conventional combination of said base and non-cordless handset associated with said base; said base having a respective modular socket suitable for accommodating a corresponding modular male plug of a telephone cord to establish connection between said base and handset, said base also including a handset cradle with a switch hook operatively attached thereto;

b a first transmitter/receiver for transmitting and receiving electromagnetic waves and a respective modular male plug received in said modular socket for enabling the first transmitter/receiver to be electrically connected to said non-cordless telephone base;

c a cordless handset replacing the conventional handset received in and resting on said handset cradle of said non-cordless conventional telephone base without any interfacing structural elements, and a second transmitter/receiver mounted within the replacement handset and effective for transmitting/receiving electromagnetic waves and for communicating wirelessly with the first transmitter/receiver;

d a battery and power saving circuit in said handset, said power saving circuit including a normally off relay means with means to close the switch contacts of said relay means that includes a omni-directional motion sensitive switch to detect movement of said handset; and e a timer circuit with said motion sensitive switch and said relay means in circuit therewith to maintain said switch contacts of said relay closed for a fixedly adjustable time interval.

13. The telephone of claim 12, wherein the first and second transmitter/receiver are effective for communicating with one another through radio waves.

14. The telephone of claim 12, wherein the first transmitter/receiver is housed within a transmitter/receiver body and the respective modular plug of the first transmitter/receiver is attached directly onto the first transmitter/receiver body.

15. The telephone of claim 12, further including telephone mounting means for enabling securing the first transmitter/receiver body to the conventional non-cordless telephone base.

16. The telephone of claim 12, further including timer means in circuit with said motion sensitive switch and said relay to maintain said switch contacts of said relay closed for a fixedly adjustable time interval.

17. The telephone of claim 12, further including first channel scanning circuit means in circuit with said first transmitter/receiver, and coacting second channel scanning circuit means in circuit with said second transmitter/receiver, with said channel scanning circuit means operative to select and lock onto a low energy channel.

18. The telephone of claim 12, wherein said first and second channel scanning circuit means include a hand-shaking routine to select said low energy channel.

19. The telephone of claim 16 where the battery is rechargeable with means to recharge the battery.

* * * * *